United States Patent [19]
Kim et al.

[11] Patent Number: 5,696,868
[45] Date of Patent: Dec. 9, 1997

[54] APPARATUS AND METHOD FOR RECORDING/PLAYING BACK BROADCASTING SIGNAL

[75] Inventors: Sang Su Kim, Seoul; Young Man Kim, Kyungki-Do; Yong Taek Lim; Se Yong Ro, both of Seoul, all of Rep. of Korea

[73] Assignee: Goldstar Co., Ltd., Seoul, Rep. of Korea

[21] Appl. No.: 699,198

[22] Filed: Aug. 19, 1996

Related U.S. Application Data

[63] Continuation of Ser. No. 266,624, Jun. 28, 1994, abandoned.

[30] Foreign Application Priority Data

Jun. 28, 1993 [KR] Rep. of Korea ............... 11840/1993
Sep. 18, 1993 [KR] Rep. of Korea ............... 18946/1993

[51] Int. Cl.$^6$ .................. H04N 5/92; H04N 5/783
[52] U.S. Cl. .................. 386/46; 386/68; 386/69
[58] Field of Search .................. 358/335, 343; 360/19.1, 10.1, 10.2, 10.3, 69; 386/46, 68, 6, 7, 8, 1, 81, 75, 96; H04N 5/92, 5/76, 5/783

[56] References Cited

U.S. PATENT DOCUMENTS 4,706,121 11/1987 Young ............... 358/142
4,794,465 12/1988 Van Luyt et al. ............... 358/341
5,329,320 7/1994 Yifrach ............... 358/343

*Primary Examiner*—Thai Tran
*Assistant Examiner*—Luanne P. Din

[57] ABSTRACT

An apparatus and a method for recording/playing back a broadcasting signal wherein the broadcasting signal is separated into a video signal and an audio signal and then written into video and audio signal memories. The video and audio signals are read from the video and audio signal memories if a HISTORY mode key is ON. The operation is ended if a REVIEW key is OFF under the condition that the HISTORY mode key is off. If the REVIEW key is ON the write operation of the video signal into the video signal memory is stopped and it is discriminated whether a JOG key is ON or OFF. A video signalportion of a predetermined previous interval is read from the video signal memory if it is discriminated that the JOG key is OFF. If the JOG key is ON, a read timing signal is generated to read the video signal from the video signal memory according to an operation of the JOG key. The video signal is read from the video signal memory with an address being incremented, if it is discriminated that the JOG key is operated clockwise. If it is discriminated that the JOG key is operated counterclockwise, the video signal is read from the video signal memory with the address being decremented.

21 Claims, 2 Drawing Sheets

APPARATUS AND METHOD FOR RECORDING/PLAYING BACK BROADCASTING SIGNAL

This application is a continuation of application Ser. No. 08/266,624 filed on Jun. 28, 1994, now abandoned.

BACKGROUND OF THE INVENTION

1. Field of the Invention

The present invention relates in general to recording/playback of a broadcasting signal, and more particularly to an apparatus and a method for recording/playing back the broadcasting signal in which the broadcasting signal is always written by a predetermined interval on memory devices while it is viewed by the user, so that a desired broadcasting signal portion of a previous interval can be played back according to a user's request and then viewed by him.

2. Description of the Prior Art

Generally, a recording/playback system such as a video cassette recorder (VCR) and the like is used to record and playback a broadcasting signal to allow the user to view it. In such a recording/playback system, a recording function must previously be set by the user for the recording of the broadcasting signal.

In the case where only a portion of the broadcasting signal is to be recorded and played back in such a recording/playback system, the user must estimate the corresponding interval to previously set the recording function. For example, when the user would like to record a home run scene while viewing a baseball game, he must estimate a point of time that the home run is to be hit and then previously set the recording function. However, such an estimation is next to impossible. For this reason, the entire baseball game scene has to be recorded with an inconvenience.

SUMMARY OF THE INVENTION

Therefore, the present invention has been made in view of the above problem, and it is an object of the present invention to provide an apparatus and a method for recording/playing back a broadcasting signal in which the broadcasting signal is always written by a predetermined interval into memory devices while it is viewed by the user, so that a desired broadcasting signal portion of a previous interval can be played back with no degradation in a picture quality in a normal speed mode, an intermittent motion mode or a still mode according to a user's request.

In accordance with one aspect of the present invention, there is provided an apparatus for recording/playing back a broadcasting signal, comprising key input means for inputting a function key signal selected by the user; video/audio signal separation means for separating a video signal and an audio signal from the broadcasting signal inputted therein; video signal processing means for writing the video signal from said video/audio signal separation means and reading the written video signal; audio signal processing means for writing the audio signal from said video/audio signal separation means and reading the written audio signal; selection means for selectively outputting the broadcasting signal, an output video signal from said video signal processing means and an output audio signal from said audio signal processing means; timing generation means for controlling said video signal processing means and said audio signal processing means to play back the video and audio signals therefrom in a normal speed mode, an intermittent motion mode or a still mode; and control means for controlling said timing generation means and said selection means in response to the function key signal inputted by said key input means to play back the video signal from said video signal processing means and the audio signal from said audio signal processing means in the normal speed mode, the intermittent motion mode or the still mode.

In accordance with another aspect of the present invention, there is provided a method of recording/playing back a broadcasting signal, comprising the steps of (a) separating a video signal and an audio signal from the broadcasting signal inputted and writing the separated video and audio signals into video and audio signal memories, respectively; (b) discriminating whether a HISTORY mode key is ON or OFF and reading the video and audio signals from said video and audio signal memories if it is discriminated that the HISTORY mode key is ON; (c) discriminating whether a REVIEW key is ON or OFF, if it is discriminated that said HISTORY mode key is OFF, and ending the operation if it is discriminated that the REVIEW key is OFF; (d) stopping the write operation of the video signal into said video signal memory and discriminating whether a JOG key is ON or OFF, if it is discriminated that the REVIEW key is ON, and reading a video signal portion of a predetermined previous interval from said video signal memory if it is discriminated that the JOG key is OFF; (e) generating a read timing signal to read the video signal from said video signal memory according to an operation of said JOG key, if it is discriminated that said JOG key is ON; and (f) discriminating whether said JOG key is operated clockwise or counter-clockwise, reading the video signal from said video signal memory with an address being incremented, if it is discriminated that said JOG key is operated clockwise, and reading the video signal from said video signal memory with the address being decremented, if it is discriminated that said JOG key is operated counter-clockwise.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
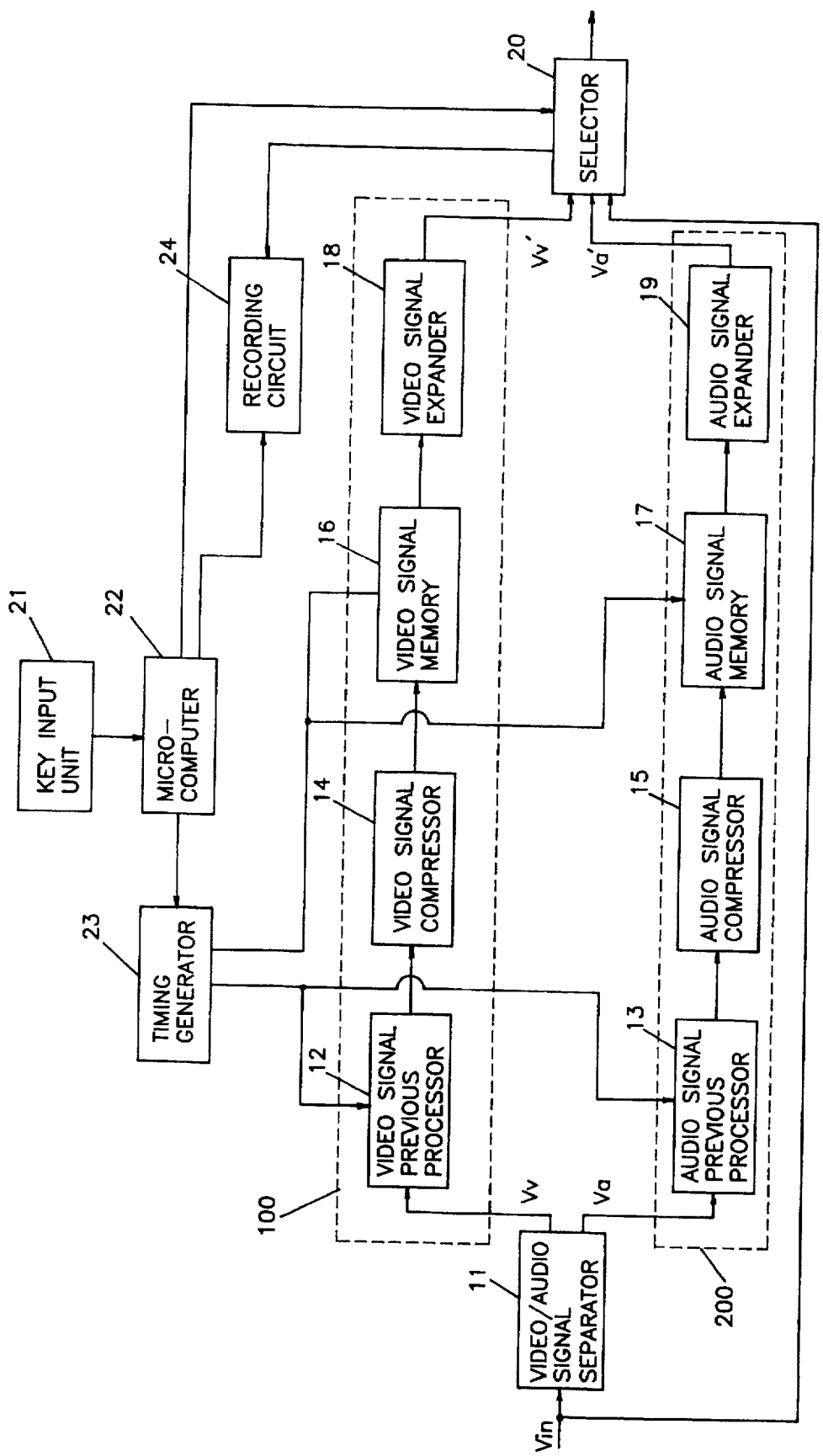
FIG. 1 is a block diagram of an apparatus for recording/playing back a broadcasting signal in accordance with the present invention.

Referring to FIG. 1, there is shown a block diagram of an apparatus for recording/playing back a broadcasting signal in accordance with the present invention. As shown in this drawing, the recording/playback apparatus comprises a video/audio signal separator 11 for separating a video signal Vv and an audio signal Va from the broadcasting signal Vin inputted therein, a video signal processing circuit 100 for writing the video signal Vv from the video/audio signal separator 11 in a compression manner under control of a timing generator 23, reading the written video signal under the control of the timing generator 23 and outputting the read video signal to a selector 20, and an audio signal processing circuit 200 for writing the audio signal Va from the video/audio signal separator 11 in the compression manner under the control of the timing generator 23, reading the written audio signal under the control of the timing generator 23 and outputting the read audio signal to the selector 20.

The selector 20 is adapted to selectively output the broadcasting signal Vin, an output video signal Vv' from the video signal processing circuit 100 and an output audio signal Va' from the audio signal processing circuit 200 under control of a microcomputer 22.

A key input unit 21 is also provided in the recording/playback apparatus to input a function key signal selected by the user.

The microcomputer 22 is adapted to control the timing generator 23, the selector 20 and a recording circuit 24 in response to the function key signal inputted by the key input unit 21.

The timing generator 23 is adapted to control the video signal processing circuit 100 and the audio signal processing circuit 200 under the control of the microcomputer 22.

The recording circuit 24 is adapted to record an output signal from the selector 20 on a semi-permanent recording medium under the control of the microcomputer 22.

The video signal processing circuit 100 includes a video signal previous processor 12 for converting a format of the video signal Vv from the video/audio signal separator 11 under the control of the timing generator 23 for the compression thereof, a video signal compressor 14 for compressing an output signal from the video signal previous processor 12, a video Signal memory 16 for writing an output signal from the video signal compressor 14 therein under the control of the timing generator 23 and outputting the written signal under the control of the timing generator 23, and a video signal expander 18 for expanding an output signal from the video signal memory 16 into its original state.

The audio signal processing circuit 200 includes an audio signal previous processor 13 for converting a format of the audio signal Va from the video/audio signal separator 11 under the control of the timing generator 23 for the compression thereof, an audio signal compressor 15 for compressing an output signal from the audio signal previous processor 13, an audio signal memory 17 for writing an output signal from the audio signal compressor 15 therein under the control of the timing generator 23 and outputting the written signal under the control of the timing generator 23, and an audio signal expander 19 for expanding an output signal from the audio signal memory 17 into its original state.

Figure 2:
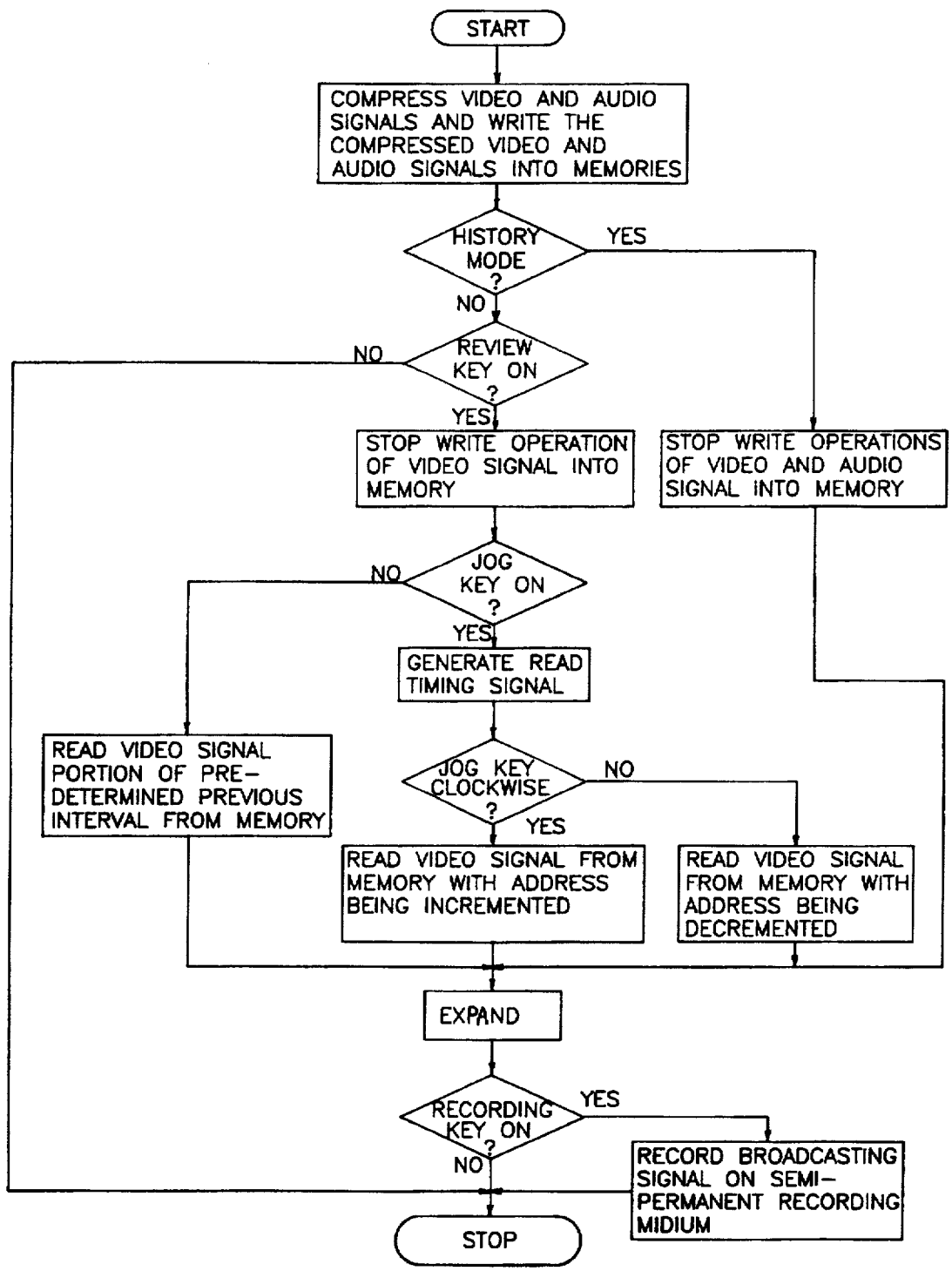
FIG. 2 is a flowchart illustrating a method of recording/playing back the broadcasting signal in accordance with the present invention.

The operation of the recording/playback apparatus with the above-mentioned construction in accordance with the present invention will hereinafter be described in detail with reference to FIG. 2, which is a flowchart illustrating a method of recording/playing back the broadcasting signal in accordance with the present invention.

It should be noted that the recording/playback apparatus of the present invention is applicable to a television receiver or a VCR. When the broadcasting signal Vin is applied to the recording/playback apparatus of the present invention, it is then transferred to a monitor and a speaker through the selector 20 and also to the video/audio signal separator 11.

The video/audio signal separator 11 separates the video signal Vv and the audio signal Va from the inputted broadcasting signal Vin and outputs the separated video and audio signals to the video signal processing circuit 100 and the audio signal processing circuit 200, respectively. In the video signal processing circuit 100, the video signal previous processor 12 converts the format of the video signal Vv from the video/audio signal separator 11 under the control of the timing generator 23 so that it can be compressed by the video signal compressor 14, and outputs the resultant video signal to the video signal compressor 14. Also, in the audio signal processing circuit 200, the audio signal previous processor 13 converts the format of the audio signal Va from the video/audio signal separator 11 under the control of the timing generator 23 so that it can be compressed by the audio signal compressor 15, and outputs the resultant audio signal to the audio signal compressor 15.

Then, the video signal compressor 14 compresses the output signal from the video signal previous processor 12 and output the resultant video signal to the video signal memory 16. Also, the audio signal compressor 15 compresses the output signal from the audio signal previous processor 13 and outputs the resultant audio signal to the audio signal memory 17.

In other words, the broadcasting signal Vin is applied to the monitor and the speaker through the selector 20 and then outputted as the video and audio signals thereby, at the same time that it is separated into the video and audio signal, compressed and then stored into the video and audio signal memories 16 and 17.

Under this condition, when the user intends to view a desired previous picture in a normal speed mode, he will push a HISTORY mode key on the key input unit 21. With the HISTORY mode key pushed, the corresponding key signal is applied to the microcomputer 22 through the key input unit 21. Upon receiving the HISTORY mode key signal, the microcomputer 22 first controls the video signal previous processor 12 and the audio signal previous processor 13 through the timing generator 23. In response to the control of the timing generator 23 under the control of the microcomputer, the video signal previous processor 12 and the audio signal previous processor 13 block the input of the video and audio signals from the video/audio signal separator 11, respectively. Also, in response to the control of the timing generator 23 under the control of the microcomputer, the video signal memory 16 and the audio signal memory 17 output video and audio signal portions which have been written therein a predetermined time period before the moment that the HISTORY key signal is applied to the microcomputer 22, respectively.

The video signal previous processor 12 and the audio signal previous processor 13 are also controlled by the timing generator 23 under the control of the microcomputer 22 such that the write operations of the video and audio signals into the video signal memory 16 and the audio signal memory 17 can further be performed for a predetermined time period after the moment that the HISTORY key signal is applied to the microcomputer 22, respectively. These further write operations are performed for the successive signal playback before and after the moment that the HISTORY key signal is applied to the microcomputer 22.

Then, the video signal expander 18 expands the read video signal from the video signal memory 16 into its original state and the audio signal expander 19 expands the read audio signal from the audio signal memory 17 into its original state. The selector 20 selects the output video signal Vv' from the video signal expander 18 and the output audio signal Va' from the audio signal expander 19 under the control of the microcomputer 22. As a result, a broadcasting signal portion of a predetermined previous interval from the moment that the HISTORY key signal is applied to the microcomputer 22 can be played back in the normal speed mode.

On the other hand, in the case where the user pushes a REVIEW key on the key input unit 21 to view a desired previous picture in a still mode or an intermittent motion mode, the corresponding key signal is applied to the microcomputer 22 through the key input unit 21. Upon receiving the REVIEW key signal, the microcomputer 22 controls the timing generator 23 and the selector 20. Namely, the microcomputer 22 controls the video signal previous processor 12 through the timing generator 23 such that the write operation of the video signal into the video signal memory 16 can sequentially be performed for a predetermined time period after the moment that the REVIEW key signal is applied to the microcomputer 22.

The microcomputer 22 then checks whether a JOG key ON signal is inputted. If it is checked that the JOG key ON signal is not inputted, the microcomputer signal the video signal memory 16 through the timing generator 23 such that the video signal is read from a location of the video signal memory 16 corresponding to an address of a predetermined previous interval from the moment that the REVIEW key signal is applied to the microcomputer 22, and then applied to the video signal expander 18. The video signal expander 18 expands the read video signal from the video signal memory 16 into its original state and outputs the expanded video signal to the selector 20. Then, the selector 20 selects the output video signal Vv' from the video signal expander 18 under the control of the microcomputer 22.

By the way, if it is checked that the JOG key ON signal is inputted, the microcomputer 22 controls the timing generator 23 to generate a read timing signal and output the generated read timing signal to the video signal memory 16. The read timing signal from the timing generator 23 is in synchronization with vertical and horizontal synchronous signals Vsync and Hsync of the video signal to prevent a degradation in a picture quality in that the read speed of the video signal from the video signal memory 16 is not a normal speed (30 frames/sec) but a random speed based on the operation of the JOG key.

The microcomputer then checks whether the JOG key is operated clockwise or counter-clockwise. If it is checked that the JOG key is operated clockwise, the microcomputer 22 controls the timing generator 23 such that the video signal is read from the video signal memory 16 with the address being incremented. As a result, the intermittent motion is displayed in a normal direction. On the contrary, if it is checked that the JOG key is operated counter-clockwise, the microcomputer 22 controls the timing generator 23 such that the video signal is read from the video signal memory 16 with the address being decremented. As a result, the intermittent motion is displayed in a reverse direction.

Then, the video signal expander 18 expands the read video signal from the video signal memory 16 into its original state and outputs the expanded video signal to the selector 20. Under the control of the microcomputer 22, the selector 20 selects the output video signal Vv' from the video signal expander 18 and outputs the selected video signal to the monitor.

On the other hand, if it is checked that a RECORDING key signal is inputted, the microcomputer 22 controls the selector 20 and the recording circuit 24 such that the broadcasting signal selected by the selector 20 is recorded on the semi-permanent recording medium such as, for example, a magnetic tape by the recording circuit 24. If it is checked that the RECORDING key signal is not inputted, the microcomputer 22 ends the above operation.

As apparent from the above description, according to the present invention, the broadcasting signal is always written by the predetermined interval into the memory devices while it is viewed by the user. Therefore, the desired broadcasting signal portion of the previous interval can be played back with no degradation in the picture quality in the normal speed mode, the intermittent motion mode or the still mode according to the user's request. Also, the video signal and the audio signal of the broadcasting signal may be played back simultaneously or individually.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for recording/playing back a broadcasting signal, comprising:

key input means for providing a function key signal selected by the user, the function key signal being provided to a control means;

memory means for storing video signals, audio signals, or both;

video/audio signal separation means, receiving the broadcasting signal, for separating a video signal and an audio signal from the received broadcasting signal;

video signal processing means for writing the video signal from said video/audio signal separation means into said memory means and for reading the written video signal from said memory means;

audio signal processing means for writing the audio signal from said video/audio signal separation means into said memory means and for reading the written audio signal from said memory means;

selection means for selectively outputting the broadcasting signal, an output video signal from said video signal processing means, and an output audio signal from said audio signal processing means;

timing generation means, under control of said control means, for controlling said memory means to store video signals, audio signals or both during a predetermined time interval and for controlling said video signal processing means and said audio signal processing means to play back the video signals, audio signals, or both, output therefrom at various reproducing speeds; and said control means for waiting a predetermined amount of time after receiving a predetermined function key signal before issuing a stop command to said timing control means, the stop command controlling said timing control means to stop storing video signals into said memory means such that said memory means stores video and audio signals for the predetermined time interval including the predetermined amount of time after the function key signal is applied to said control means, and for controlling said timing generation means and said selection means in response to selected function key signals to play back at the various reproducing speeds the video signal stored in said memory means during the predetermined time interval both before and after the predetermined function key signal was applied, and read out by said video signal processing means, and the audio signal stored in said memory means during the predetermined time interval both before and after the predetermined function key signal was applied, and read out by said audio signal processing means.

2. The apparatus of claim 1, wherein the predetermined amount of time is longer than electronic switch delays which occur in the apparatus.

3. An apparatus for recording/playing back a broadcasting signal, as set forth in claim 1, wherein said video signal processing means includes:
- a video signal previous processor for converting a format of the video signal from said video/audio signal separation means under the control of said timing generation means;
- a video signal compressor for compressing an output signal from said video signal previous processor;
- a video signal memory for writing an output signal from said video signal compressor under the control of said timing generator and for outputting the written signal under the control of said timing generator for play back at various speeds; and
- a video signal expander for expanding an output signal from said video signal memory and outputting the expanded video signal to said selection means.

4. An apparatus for recording/playing back a broadcasting signal, as set forth in claim 1, wherein said audio signal processing means includes:
- an audio signal previous processor for converting a format of the audio signal from said video/audio signal separation means under the control of said timing generation means;
- an audio signal compressor for compressing an output signal from said audio signal previous processor;
- an audio signal memory for writing an output signal from said audio signal compressor under the control of said timing generator and for outputting the written signal under the control of said timing generator; and
- an audio signal expander for expanding an output signal from said audio signal memory and outputting the expanded audio signal to said selection means.

5. An apparatus for recording/playing back a broadcasting signal, as set forth in claim 1, further comprising:
- recording means for recording an output signal from said selection means in a non-volatile memory, under the control of said control means.

6. An apparatus as set forth in claim 5, wherein said control means controls said recording means to selectively record the output signal based upon the function key signal selected by the user.

7. A method of recording/playing back a broadcasting signal, comprising the steps of:
- (a) separating a video signal and an audio signal from the broadcasting signal and writing the separated video and audio signals into memory;
- (b) discriminating whether a HISTORY mode key is ON or OFF and reading the video and audio signals from the memory if it is discriminated that the HISTORY mode key is ON, wherein the read video and audio signals correspond to a predetermined time period including time before and a predetermined amount of time after the HISTORY mode key is discriminated as being on;
- (c) discriminating whether a REVIEW key is ON or OFF, if it is discriminated that said HISTORY mode key is OFF, and ending the operation if it is discriminated that the REVIEW key is OFF;
- (d) stopping the write operation of the video signal into the memory and discriminating whether a JOG key is ON or OFF, if it is discriminated that the REVIEW key is ON, and reading a video signal portion of a predetermined previous interval from the memory if it is discriminated that the JOE key is OFF;
- (e) generating a read timing signal to read the video signal from the memory according to an operation of said JOG key, if it is discriminated that said JOE key is ON;
- (f) discriminating whether said JOG key is operated in a first mode or a second mode, reading the video signal from the memory with an address being incremented if it is discriminated that said JOG key is operated in the first mode and reading the video signal from the memory with the address being decremented if it is discriminated that said JOG key is operated in the second mode; and
- (g) compressing the video and audio signals before being written into the memory and expanding the video and audio signals after being read from the memory.

8. A method of recording/playing back a broadcasting signal, as set forth in claim 7, further comprising the step of:
- (g) recording the video and audio signals from the memory into a non-volatile memory if a RECORDING key is ON.

9. A method as set forth in claim 7, wherein the writing of said step (a) includes separately writing the video and audio signals into respective video and audio memories.

10. A method as set forth in claim 7, further including the step of:
- (h) providing a controller for controlling the discriminating operations of said steps (b), (c), and (f), and for controlling the recording of said step (g) in response to the RECORDING key being ON.

11. The method of claim 7, wherein the predetermined amount of time is longer than electronic switch delays which may occur during implementation of the method.

12. A method for recording/reproducing an audio/video signal, comprising the steps of:
- (a) receiving the audio/video signal and continuously storing the received audio signal, video signal or both, and discarding oldest stored audio and video signals such that a predetermined time interval's worth of audio and video signals remain stored;
- (b) determining whether or not a predetermined key input signal is received by a controller;
- (c) if the predetermined key input signal is received, then waiting a predetermined time period before issuing a stop storing command such that step (a) continues for the predetermined time period after the predetermined key input signal is received by the controller, the time interval starting before and ending the predetermined amount of time after the key input signal is determined in said step (b) to be received.

13. A method for recording/reproducing an audio/video signal in accordance with claim 12, wherein said step (a) further includes the step of separating the received audio/video signal into audio and video signals, and further wherein the storing of said step (c) includes storing the separated audio and video signals for the predetermined time period.

14. A method for recording/reproducing an audio/video signal in accordance with claim 13, wherein said step (a) further includes the step of compressing the separated video and audio signals for storage into memory.

15. A method for recording/reproducing a broadcasting signal in accordance with claim 14, wherein said step (a) further includes the step of storing the audio and video signals into respective audio and video memories.

16. The method of claim 12, wherein the predetermined time period is longer than electronic switch delays which may occur during implementation of the method.

17. A method for recording/reproducing an audio/video signal in accordance with claim 12, further comprising the step of:

(d) reading and outputting the stored audio and video signal in accordance with speed mode.

18. A method for recording/reproducing an audio/video signal in accordance with claim 17, further comprising the step of:

(e) storing the audio and video signal output in said step (d) into a non-volatile recording medium.

19. A method for recording/reproducing an audio/video signal in accordance with claim 18, wherein said step (a) is preceded by the step of:

(a0) providing a single controller for controlling the determining and storing operations of said steps (b) and (c) and the storing operation of said step (e).

20. The method of claim 12, further comprising the steps of:

(d) determining whether a second key input signal is received;

(e) if the second key input signal is received, then continuing to store the video signal for a second predetermined time period after the second key input was received;

(f) extracting, after said step (e), a stored video signal corresponding to the moment the second key signal was received;

(g) displaying the extracted video signal from said step (f); and (h) determining whether a JOG key signal is received, and if so then extracting successive stored video signals for display.

21. The method of claim 20, wherein said step (h) extracts the successive stored video signals in a backward time sequence.

* * * * *